US006620371B1

(12) United States Patent
Winget et al.

(10) Patent No.: US 6,620,371 B1
(45) Date of Patent: *Sep. 16, 2003

(54) METHOD OF MANUFACTURING AN IN-MOLD LAMINATE COMPONENT

(75) Inventors: Larry J. Winget, Leonard, MI (US); Darius J. Preisler, Macomb, MI (US); Jason T. Murar, Clinton Township, MI (US)

(73) Assignee: Patent Holding Company, Fraser, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/482,747

(22) Filed: Jan. 13, 2000

Related U.S. Application Data

(63) Continuation-in-part of application No. 09/083,943, filed on May 22, 1998, now Pat. No. 6,428,738.

(51) Int. Cl.[7] .......................... B29C 51/10; B29C 45/14
(52) U.S. Cl. ...................... 264/513; 264/138; 264/250; 264/267; 264/275; 264/294
(58) Field of Search ................................ 264/513, 250, 264/267, 275, 138, 294; 427/412.5, 412.1; 428/31, 412, 522

(56) References Cited

U.S. PATENT DOCUMENTS

| | | | |
|---|---|---|---|
| 2,313,985 A | 3/1943 | Bradshaw |
| 3,122,598 A | 2/1964 | Berger |
| 3,740,918 A | 6/1973 | Meyer |
| 3,934,385 A | 1/1976 | Paulus et al. |
| 4,076,790 A | 2/1978 | Lind |
| 4,205,036 A | 5/1980 | Trame |
| 4,414,731 A | 11/1983 | Riemer |
| 4,431,711 A | 2/1984 | Eisfeller |
| 4,485,065 A | 11/1984 | Hatakeyama et al. |
| 4,562,032 A | 12/1985 | Gaudreau |
| 4,587,160 A | 5/1986 | Williams et al. |
| 4,634,565 A | 1/1987 | Irrgang |
| 4,734,230 A | 3/1988 | Rhodes, Jr. et al. |
| 4,769,100 A | 9/1988 | Short et al. |
| 4,810,749 A | 3/1989 | Pinchuk |
| 4,878,827 A | 11/1989 | Muller |
| 4,902,557 A | 2/1990 | Rohrbacher |
| 4,927,675 A | 5/1990 | Adams et al. |
| 4,933,237 A | 6/1990 | Krenceski et al. |
| 4,952,351 A | 8/1990 | Parker et al. |
| 4,959,189 A | 9/1990 | Rohrbacher et al. |
| 4,985,194 A | 1/1991 | Watanabe |
| 4,999,227 A | 3/1991 | Vander Togt |
| 5,019,199 A | 5/1991 | Menke et al. |
| 5,043,114 A | 8/1991 | Saito et al. |
| 5,056,814 A | 10/1991 | Shiraki et al. |
| 5,106,679 A | 4/1992 | Wataya et al. |
| 5,149,479 A | 9/1992 | Nakajima |
| 5,178,708 A | 1/1993 | Hara et al. |

(List continued on next page.)

FOREIGN PATENT DOCUMENTS

| JP | 57-163521 | 10/1982 |
|---|---|---|
| JP | 62-248611 | 10/1987 |
| JP | 4-308739 | 10/1992 |

*Primary Examiner*—Edmund H. Lee
(74) *Attorney, Agent, or Firm*—Brooks & Kushman P.C.

(57) ABSTRACT

A method is provided for manufacturing a painted plastic component having a badge, emblem or other ornamentation, such as air bag covers having a badge, or wherein the component is the badge itself. The method includes providing a painted film sheet and a one-piece thermoplastic elastomeric structural carrier. A bottom contact surface of the film sheet bonds with a front contact surface of the structural carrier by diffusion between the contact surfaces thereof within a mold cavity of an injection mold separate from the mold cavity of a vacuum mold which is utilized to vacuum-mold the film sheet to form the desired painted plastic component.

12 Claims, 3 Drawing Sheets

U.S. PATENT DOCUMENTS

| | | |
|---|---|---|
| 5,183,615 A | 2/1993 | Zushi |
| 5,217,563 A | 6/1993 | Niebling et al. |
| 5,256,354 A | 10/1993 | Chadwick |
| 5,261,984 A | 11/1993 | Minnick et al. |
| 5,286,528 A | 2/1994 | Reafler |
| 5,304,273 A | 4/1994 | Kenrick et al. |
| 5,316,822 A | 5/1994 | Nishijima et al. |
| 5,334,340 A | 8/1994 | Zushi |
| 5,335,935 A | 8/1994 | Proos et al. |
| 5,342,666 A | 8/1994 | Ellison et al. |
| 5,344,183 A | 9/1994 | Hersman et al. |
| 5,354,397 A | 10/1994 | Miyake et al. |
| 5,362,342 A | 11/1994 | Murray et al. |
| 5,401,449 A | 3/1995 | Hill et al. |
| 5,423,933 A | 6/1995 | Horian |
| 5,429,786 A | 7/1995 | Jorgan et al. |
| 5,443,777 A | 8/1995 | Mills |
| 5,456,957 A | 10/1995 | Jackson et al. |
| 5,458,361 A | 10/1995 | Gajewski |
| 5,466,412 A | 11/1995 | Parker et al. |
| 5,520,412 A | 5/1996 | Davis |
| 5,529,336 A | 6/1996 | Eckhout |
| 5,626,704 A * | 5/1997 | Bowers, Jr. et al. ........ 156/245 |
| 5,642,901 A | 7/1997 | Bowman et al. |
| 5,683,101 A | 11/1997 | Davis et al. |
| 5,741,446 A | 4/1998 | Tahara et al. |
| 5,741,454 A | 4/1998 | Polidori |
| 5,744,210 A | 4/1998 | Hofmann et al. |
| 5,759,477 A | 6/1998 | Yamamoto |
| 5,763,024 A | 6/1998 | Yetka |
| 5,776,522 A | 7/1998 | Budnick |
| 5,779,841 A | 7/1998 | Yamanaka |
| 5,786,049 A | 7/1998 | Nusshor |
| 5,853,190 A | 12/1998 | Rion et al. |
| 5,968,657 A * | 10/1999 | Scullin et al. ........... 428/423.1 |
| 6,001,207 A * | 12/1999 | Enlow et al. ................ 156/230 |

* cited by examiner

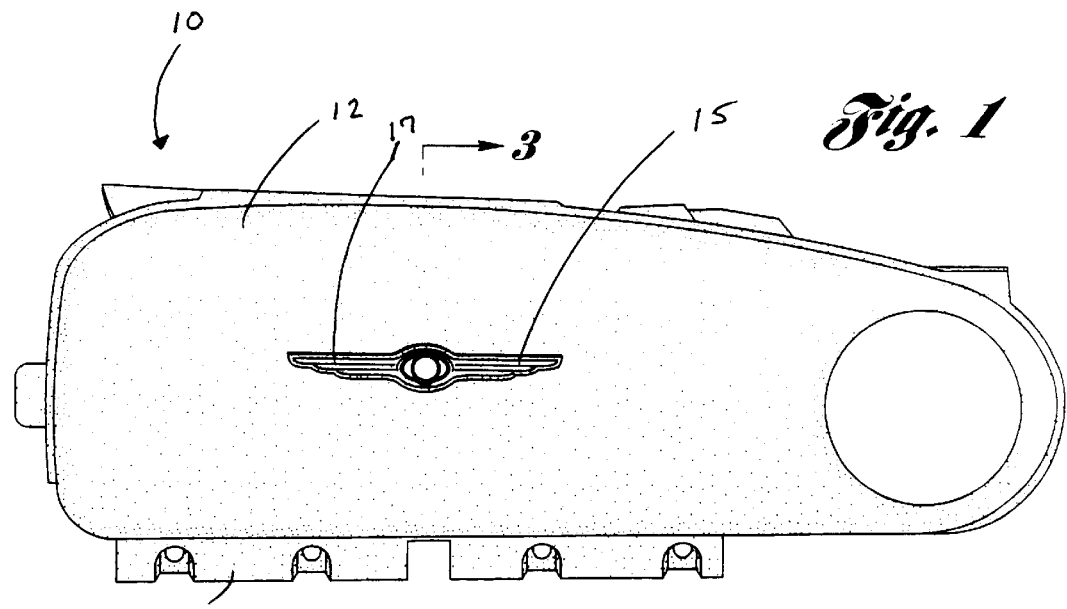
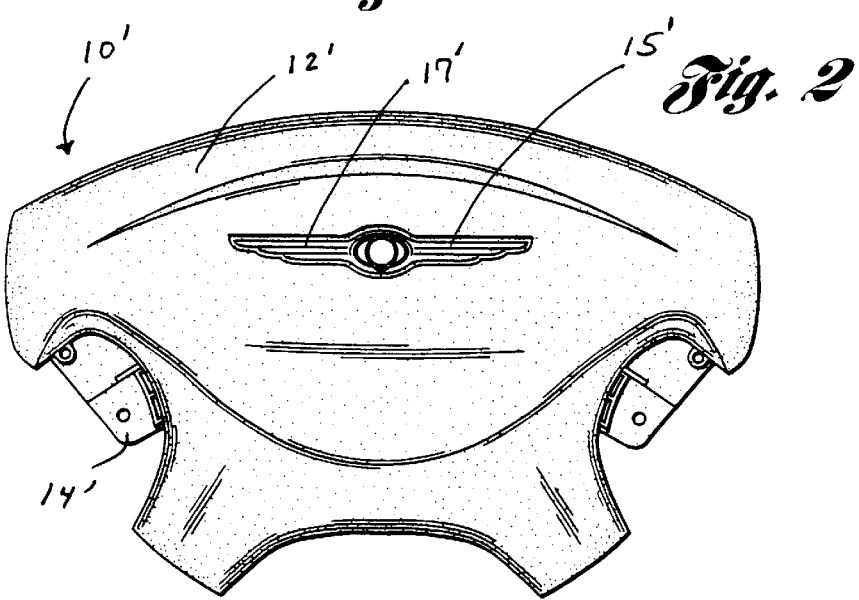
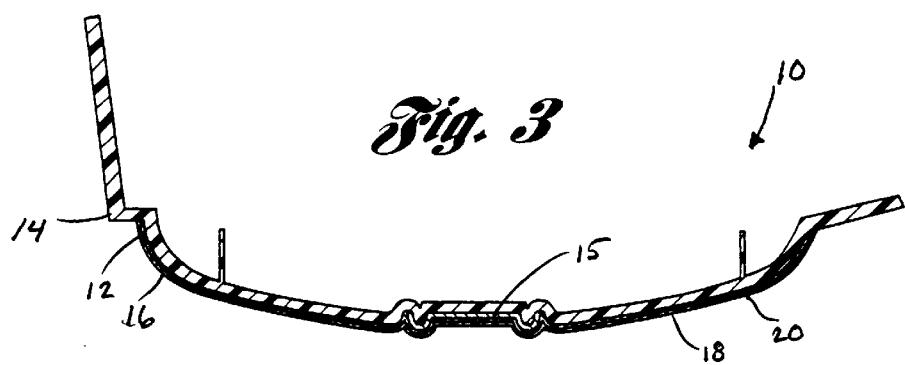

METHOD OF MANUFACTURING AN IN-MOLD LAMINATE COMPONENT

CROSS-REFERENCE TO RELATED APPLICATION

This application is a continuation-in-part of U.S. patent application Ser. No. 09/083,943, filed May 22, 1998, now issued as U.S. Pat. No. 6,428,738 titled "Method Of Manufacturing An In-Mold Laminate Component."

TECHNICAL FIELD

This invention relates to methods of manufacturing painted parts, and in particular to methods of manufacturing painted plastic parts adapted for use on motor vehicles such as air bag covers, side cladding, instrument panel cluster bezels, exterior bumpers, and the like, as well as related decorative badges and ornamentation that maybe applied thereto.

BACKGROUND ART

Typically, plastic parts are painted after they are molded. The painting process requires elaborate facilities and consequently necessitates large expenses. For instance, significant square footage of a factory must be dedicated to a clean room environment for the spraying of paint and clear coat and for the baking and curing of paint on components, such as those components used in the automotive industry, such as body panels, air bag covers, instrument panels and the like. Such parts may also include decorative badges and other emblems and ornamentation adapted to be mounted or applied to the components.

For example, conventional air bag covers used in conjunction with occupant restraint systems may sometimes include decorative badges or ornaments attached thereto which are either formed integrally with or separate from the air bag cover. Such badges may take the form of a logo or mark representing a vehicle make, model, manufacturer, or the like. These decorative badges are aesthetically pleasing and help to enhance the overall appearance of the interior of the automotive vehicle. Since many air bag covers move away from the steering column during inflation of the air bag, the associated decorative badge should be securely attached to the cover so that it does not come off during operation of the air bag.

Moreover, solvent-based paints have in recent years raised significant environmental concerns because of the volatile organic components which are emitted into the air during the application of such solvent-based paints. As a result, the evaporation of such solvents must be strictly monitored to satisfy environmental and safety regulations.

In addition, automotive components, especially interior automotive components and their badges and ornamentation, are strictly scrutinized following the painting process in order to match or conform the automotive component to the styling and aesthetic requirements of the associated interior trim product. Painting such automotive components following the molding process, raises quality concerns with respect to the color, consistency, and thickness of each individual paint application.

U.S. Pat. No. 4,902,557, the Rohrbacher reference discloses a method and apparatus for manufacturing a thermoplastic polyolefin composite useful as an exterior auto or truck body part.

U.S. Pat. No. 4,769,100, the Short reference, teaches a method of applying a carrier film pre-printed with metallic paint to an automobile body panel in a vacuum forming process.

U.S. Pat. Nos. 4,952,351 and 5,466,412, the Parker patents, teach a method of manufacturing an air bag cover for an inflatable air bag system including a bondable film carrier, which is painted after the film carrier is molded.

However, the prior art fails to provide a method of manufacturing a painted component, including a badge, ornament or other emblem, individually or attached to the painted component, wherein the step of painting the component and badge after molding is eliminated and further where the resulting component has the structural integrity both in terms of durability and strength to support varying applications.

DISCLOSURE OF INVENTION

An object of the present invention is to provide a method for manufacturing a painted component and attached ornamentation, or painted badge and ornament attached to a painted component, while addressing paint quality issues such as: drips, runs, spits, dry spray, light coverage, gloss, color match, contamination and paint adhesion.

Another object of the present invention is to provide a method for manufacturing a painted component having a badge formed therein and reducing molding scrap due to splay, flow marks and minor surface imperfections which can be completely covered. Yet still another object of the present invention is to provide a method of manufacturing a painted component with badge, such as a composite air bag cover, side cladding, and the like, as well as painted badges and ornamentation attached to painted components wherein the badges and components have increased durability.

Another object according to the present invention is to provide a component having a decorative badge formed securely and integrally therewith such that the badge is secure and stable during use and operation of the component, such as an air bag cover, as well as a method of making the same.

In carrying out the above objects and other objects according to the present invention, provided is a molded plastic component which has an integrally molded badge which is formed in an injection mold cavity which has a shape which defines the desired plastic component. The component includes a film sheet which has a top surface and a bottom surface which together define the molded plastic component and badge. The film sheet is selected from the group consisting of polyester, polyurethane and polycarbonate. The film sheet is vacuum molded to obtain a pre-form, and the pre-form is placed in the mold cavity. Also included is a thermoplastic elastomer which is injected into the mold cavity to form a structural carrier which is bonded to the bottom surface of the pre-form in order to form the molded plastic component.

Further, a method is provided for manufacturing a plastic component, and a painted badge or ornament adapted to be integrally molded with the plastic component. The method includes the steps of providing a film sheet having top and bottom surfaces; vacuum molding the film sheet and the mold cavity to obtain a pre-form; placing the pre-form in a mold cavity of an injection mold having a shape defining the desired plastic component; and injecting a thermoplastic elastomer into the mold cavity of the injection mold to generate a structural carrier for the pre-form, the generation of the structural carrier creating sufficient pressure and heat to bond the structural carrier to the bottom surface of the pre-form to form the molded laminate component.

In another embodiment according to the present invention, a method is provided for manufacturing a molded laminate automotive component. The method includes inserting a film sheet into a vacuum forming station to form the film sheet into a predetermined automotive component shape to create a formed film sheet having top and bottom surfaces, placing the formed film sheet in a mold cavity of an injection mold having a shape defining the automotive component, and injecting a thermoplastic elastomer into the mold cavity of the injection mold, such that the thermoplastic elastomer is in mating contact with the bottom surface of the formed film sheet, to generate a structural carrier for the formed film sheet, the generation of the structural carrier creating sufficient pressure and heat to bond the structural carrier to the bottom surface of the formed film sheet to form the molded laminate automotive component.

In still another embodiment, a method of manufacturing a molded laminate automotive component with integral badge portion includes inserting a film sheet into a vacuum forming station to form the film sheet into a predetermined component and badge shape to create a formed film sheet having top and bottom surfaces, the film sheet being selected from the group consisting of polyester, polyurethane and polycarbonate. the method also includes placing the formed film sheet in an injection mold cavity having a shape defining the automotive component with integral badge portion. The method further includes injecting a thermoplastic elastomer into the mold cavity such that the thermoplastic elastomer is in mating contact with the bottom surface of the formed film sheet, thereby generating a structural carrier for the formed film sheet. The generation of the structural carrier creates sufficient pressure and heat to bond the structural carrier to the bottom surface of the formed film sheet to form the molded laminate component with integral badge portion.

In still yet another embodiment of the method of manufacturing a molded plastic component, the method includes providing a film sheet having top and bottom surfaces, and which the film sheet is selected from the group consisting of polyester, polyurethane and polycarbonate. Further, the method includes vacuum molding the film sheet in a mold cavity to obtain a pre-form, placing the pre-form in a mold cavity of an injection mold having a shape defining the desired plastic component with a badge portion, and injecting a thermoplastic elastomer into the mold cavity of the injection mold to generate a structural carrier for the pre-form. The generation of the structural carrier creates sufficient pressure and heat to bond the structural carrier to the bottom surface of the pre-form in order to form the molded laminate plastic component wherein the film sheet is coated with a layer of acrylic color and polyvinylidine fluoride and an acrylic clear coat layer.

Still further, another embodiment of a method of manufacturing a molded laminate automotive component and badge assembly includes inserting a film sheet into a vacuum forming station to form the film sheet into a predetermined shape corresponding to the component and badge assembly in order to create a formed film sheet having top and bottom surfaces. The formed film sheet is placed in an injection mold cavity which has a shape defining the component and badge assembly. Further, a thermoplastic elastomer is injected into the injection mold cavity, such that the thermoplastic elastomer is in mating contact with the bottom surface of the formed film sheet, thereby generating a structural carrier for the formed film sheet. The generation of the structural carrier creates sufficient pressure and heat to bond the structural carrier to the bottom surface of the formed film sheet to form the molded laminate component and badge assembly. The film sheet may be coated with a layer of acrylic color and polyvinylidine fluoride and an acrylic clear coat layer.

The above objects and other objects, features and advantages of the present invention are readily apparent from the following detailed description of the best mode for carrying out the invention when taken in connection with the accompanying drawings.

BRIEF DESCRIPTION OF DRAWINGS

FIG. 1 is a front elevational view of one type of air bag cover adapted to be mounted on a side door or passenger side dashboard having a decorative badge formed therewith;

FIG. 2 is a front elevational view of a driver's side air bag cover having a badge formed therewith;

FIG. 3 is a sectional view of the air bag cover of FIG. 1 taken along lines 3—3;

BEST MODE FOR CARRYING OUT THE INVENTION

Figure 4:
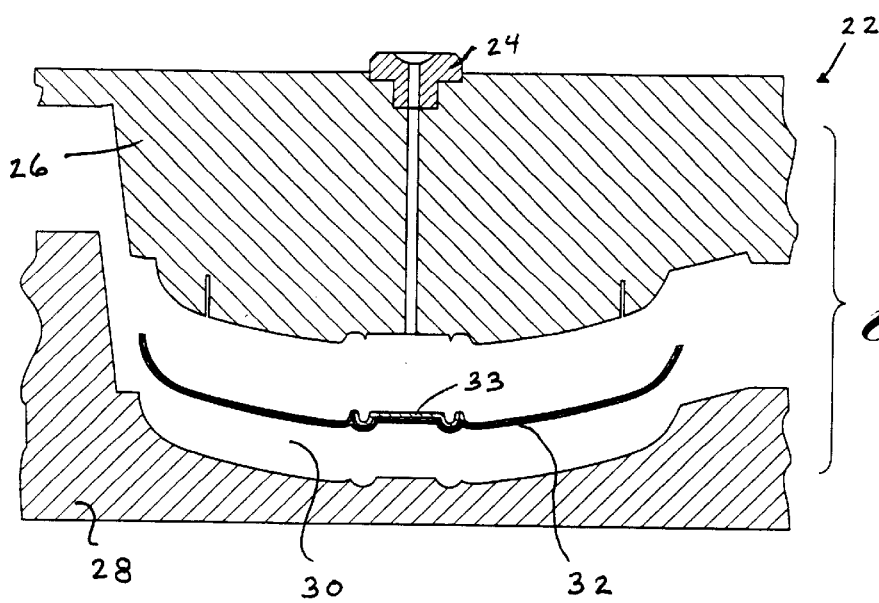
FIG. 4 is a schematic view of a conventional injection molding system which may be utilized to make the plastic components of the present invention, the system is depicted in an open position with the pre-form placed between two plates of the mold body.

While the examples and figures provided herein refer to automotive plastic components, this invention has substantial application in other areas and is thus intended to have broader scope than the cited representative examples. In essence, this invention can be used with any application calling for a painted plastic component.

Referring now to the drawing figures, there is illustrated in FIG. 1 a front elevational view of one type of air bag cover, generally indicated at 10, adapted to be mounted on an automotive side door passenger side or dashboard. The air bag cover assembly 10 incorporates a badge 15 (or emblem or ornament, etc.) thereon, which is preferably integrally molded with the air bag cover assembly according to the teachings of the present invention. Badge 15 may have any shape, size or contour feasible according to the application and the teachings according to the present invention. For example, as illustrated in FIGS. 1 and 2, badge 15 may be symmetrical, elongated, have curvature, and sufficient detail, such as the raised wing-like portions 17 of badge 15.

Badge portion 15 is also shown as relatively small in comparison to the size of its respective component, such as air bag cover 10.

Air bag cover assembly 10 includes a painted one-piece outer layer 12, composed of a film sheet, preferably a pre-painted film sheet, which is vacuum molded in a vacuum mold from a material compatible with the air bag body or structural carrier 14, which is preferably injection molded in an injection mold. The air bag body 14 is preferably composed of a thermoplastic elastomer. The elastomer of the air bag body or structural carrier 14 should be compatible with the outer layer 12 so that a bottom contact surface of the outer layer 12, mounts with the front contact surface of the air bag body 14 by diffusion between the surfaces thereof in the injection mold to prevent the air bag body 14 from separating from the outer layer 12 during use of the air bag cover 10.

The outer layer 12 is composed of a film sheet that is pre-painted. The film sheet is preferably a polyester sheet such as Mylar®, a polyurethane or polycarbonate sheet.

FIG. 2 illustrates a front elevational view of another type of air bag cover, generally indicated as air bag cover assembly 10', which is adapted to be mounted on the driver's side of the automobile on the steering wheel. The components of air bag cover assembly 10' that are common to assembly 10 are given like reference numerals with a prime (') designation. As illustrated in FIG. 2, air bag cover assembly 10' includes a painted one-piece outer layer 12' and a structural carrier 14'. Air bag cover assembly 10' also includes a badge 15' or ornament which is disposed thereon and is preferably attached to the air bag cover by way of an in-mold laminate process according to the teachings of the present invention.

In the preferred embodiment, the outer layer comprises a film sheet with the following coatings placed thereon, a layer of acrylic color in mating contact with the film sheet and a layer of polyvinylidine fluoride (PVDF) with an acrylic clear coat to protect the film from damage and to provide film elasticity, chemical resistance, stain resistance, weathering and UV protection. In the most preferred embodiment, PVDF comprises 72% of the total film thickness which is 0.2 mils.

The thermoplastic elastomer of the air bag body or structural carrier 14 is preferably a thermoplastic elastomer such as a thermoplastic polyolefin, thermoplastic urethane, polyester, polycarbonate, a mixture of polycarbonate and ABS (acrylonitrile/butadiene/styrene) or similar material.

For other automotive applications, the carrier 14 is varied to accommodate the intended use. Accordingly, for bumper/fascia applications, the structural carrier 14 can be selected from at least the following materials: lomod®, bexloy® and thermoplastic polyolefin. For cluster bezel applications, the structural carrier 14 can be selected from at least the following materials: ABS (acrylonitrile/butadiene/styrene), a mixture of polycarbonate and ABS, polycarbonate, and polypropylene.

The durometer and elastic or flex modulus of the materials also vary depending on the desired stiffness of the component. Typically, the durometer of the air bag body 14 will be in the range of about 20 Shore D to 100 Shore D, while the flexural modulus will be in the range of about 15,000 to about 400,000 psi. Also, typically, the durometer of the outer layer 12 will be in the range of about 15 Shore A to 100 Shore A. These ranges of course vary depending on the desired plastic component to be manufactured and are only illustrative of one example.

As depicted in FIG. 3, a sectional view of the air bag cover of FIG. 1 taken along lines 3—3, in a manufactured component with integrally formed in-mold badge 15, the air bag body or structural carrier 14 supports the outer layer 12 which has a pre-painted coating 16 placed thereon, followed by a base coat 18, preferably a layer of acrylic color, and a clear coat 20, preferably an acrylic clear coat and a layer of PVDF.

Referring now to FIG. 4, there is illustrated a conventional injection mold, generally indicated at 22, for making a plastic component with badge pursuant to the present invention.

Briefly, with an injection molding system there is included an injection molding machine, having a nozzle, generally indicated at 24, for injecting predetermined amounts or shots of molten resin. The injection molding machine includes a hydraulic screw ram which is disposed in a bore formed in a barrel of the injection molding machine. The ram plasticizes and advances resin towards the nozzle 24. Upon complete plasticization of the resin, the screw ram is hydraulically advanced towards threaded portions of the barrel to inject molten plastic through the nozzle 24, as is well known in the art.

Figure 5:
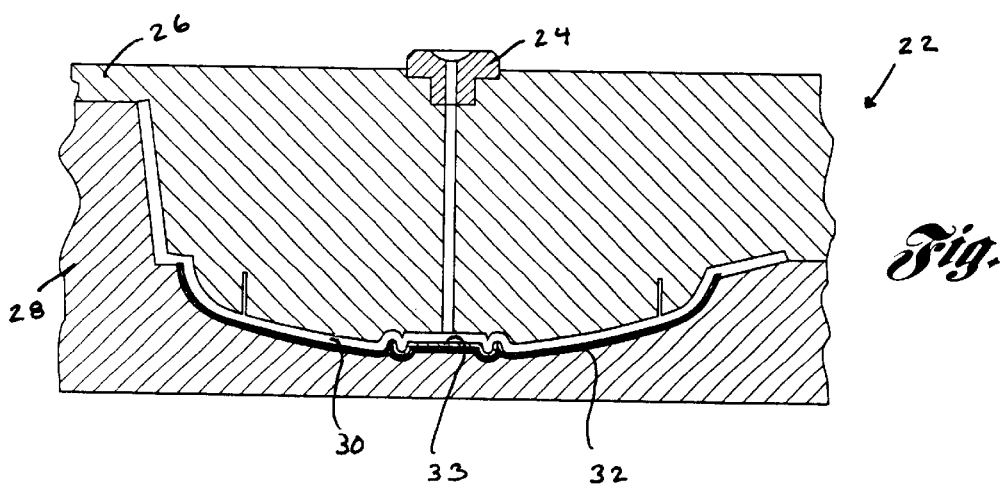
FIG. 5 is a schematic view of the conventional injection molding system of FIG. 4 shown in a closed position, with the pre-form placed between the two plates of the mold body.
Figure 6:
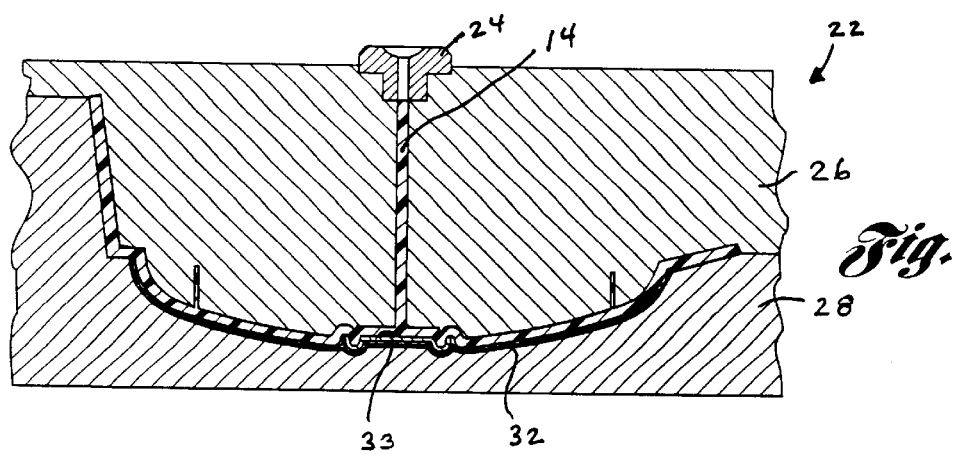
FIG. 6 is a schematic view of the conventional injection molding system of FIGS. 4 and 5 showing the mold cavity with the molten resin injected therein to form the structural carrier for the pre-form.

As depicted in FIG. 4, opposing surfaces of male and female mold parts 26 and 28 respectively define a mold cavity 30 in which the plastic component and badge assembly 10 are formed. As illustrated in FIG. 5, there is a depiction of a one-piece pre-form 32 including a badge portion 33 created from the vacuum molded film sheet which is first placed in the mold cavity 30. Thereafter, as depicted in FIG. 6, the air bag body or structural carrier 14 is molded in the plastic injection molding system to form a completed unitary laminate plastic component and badge.

The body of the air bag cover and badge 14 may also be formed from thermoplastic polyolefin, polycarbonate, tee tpe, sebs tpe, and a mixture of polycarbonate and acrylonitrile/butadiene/styrene (ABS). The corresponding film sheet 12 must be compatible with the plastic of the body and badge so that diffusion between contact surfaces occurs. Additionally, the laminate should be compatible with the substrate on which the laminate is to be adhered. In general, this requirement is achieved by selecting a structural carrier 14 with at least one or more materials common to the substrate on which the laminate is to be adhered. As an example, with a thermoplastic polyolefin substrate, the structural carrier should include polypropylene.

In an alternative embodiment, the mold can be modified to produce a plastic component and/or badge with embossed lettering. This embossed effect is achieved by etching into the mold the desired pattern or letters so that the letters have at least a 0.5 mm radius on the edge of the letter, or else the film will tear and stretch.

The unique features of the laminate plastic components are 1) a stiff inner material to support the intended application; 2) reduction and/or elimination of paint problems such as drips, runs, spits, dry spray, light coverage and gloss and improved color match and paint adhesion; 3) reduced molding scrap due to splay, flow marks and minor surface imperfections, which can be completely covered; and 4) increased durability of the resulting plastic laminate components.

It should be understood that the film sheet can be positioned in the injection mold either by way of a pre-form, as described above, or by way of a film roll supply. In this way, one can mold in the color at the press or mold thereby avoiding a secondary painting operation.

Figure 7:
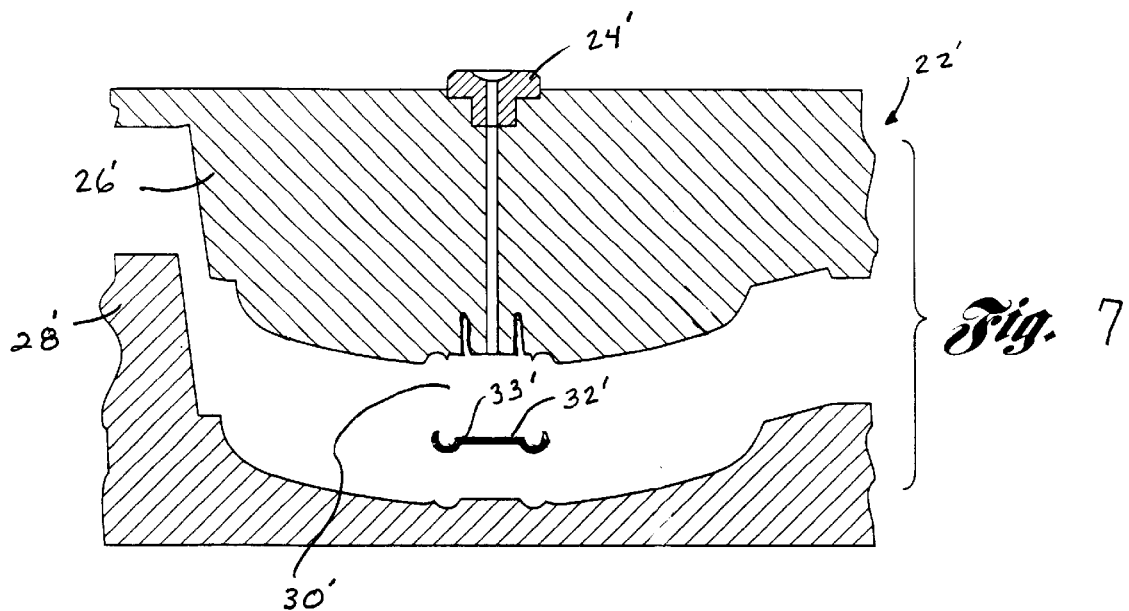
FIG. 7 is a schematic view of a conventional injection molding system which may be utilized to make the badge according to the present invention, the system shown in an open position with the pre-form placed between two plates of the mold body.
Figure 8:
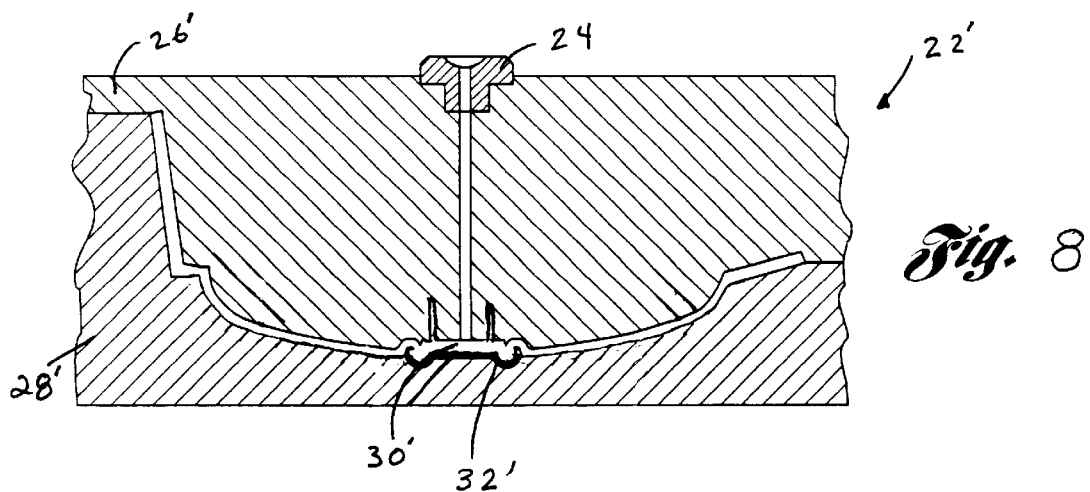
FIG. 8 is a schematic view of the conventional injection molding system of FIG. 7 shown in a closed position, with the pre-form placed between the two plates of the mold body.
Figure 9:
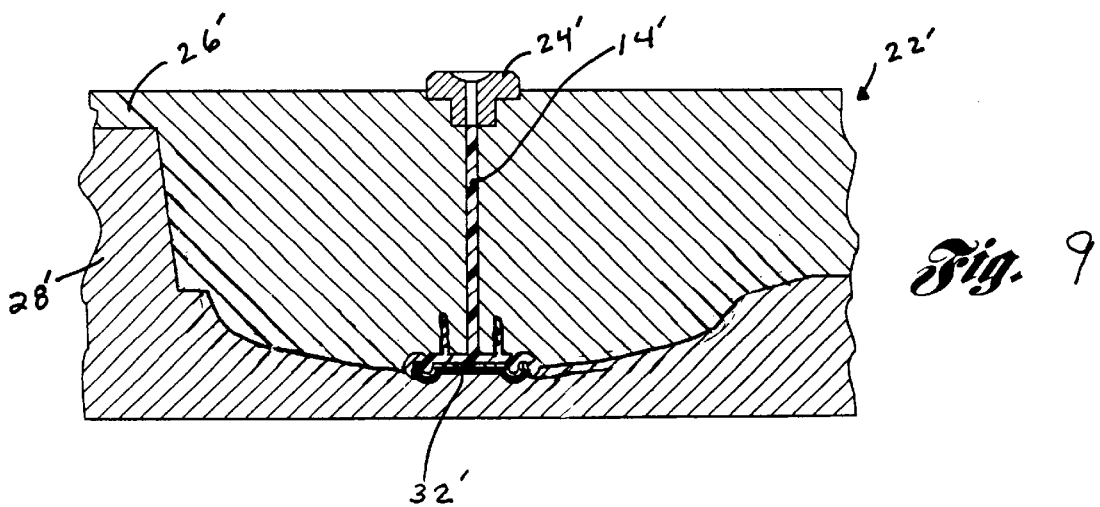
FIG. 9 is a schematic view of a conventional injection molding system shown in FIGS. 7 and 8 illustrating the mold cavity with the molten resin injected therein to form the structural carrier for the pre-form.

With reference to FIGS. 7, 8, and 9, shown therein is a process similar for forming laminate badge 15 according to the teachings of the present invention, and similar to that disclosed in FIGS. 4, 5, and 6, where like components in FIGS. 7, 8, and 9 are given like reference numerals with a prime (') designation. Accordingly, as shown in FIG. 7, opposing surfaces of male and female mold parts 26' and 28' respectively define a mold cavity 30' in which the plastic badge portion 15' is formed.

As illustrated in FIG. 8, a one-piece pre-form 32' which defines badge portion 33' created from the vacuum molded film sheet is first placed in the mold cavity 30'. Thereafter, as shown in FIG. 9, the badge structural carrier 14' is molded in the plastic injection molding system to form a completed unitary laminate plastic badge.

While the best mode for carrying out the invention has been described in detail, those familiar with the art to which this invention relates will recognize various alternative designs and embodiments for practicing the invention as defined by the following claims. It is understood, of course, that while the forms of the invention herein shown and described include the best mode contemplated for carrying out the present invention, they are not intended to illustrate all possible forms thereof. It will also be understood that the words used are descriptive rather than limiting, and that various changes may be made without departing from the spirit or scope of the invention as claimed below.

What is claimed is:

1. A method of manufacturing a molded plastic badge, comprising:
    providing a film sheet having top and bottom surfaces defining a badge, the film sheet being selected from the group consisting of polyester, polyurethane and polycarbonate, wherein the film sheet is coated with a layer of acrylic color and polyvinylidine fluoride and an acrylic clear coat;
    vacuum molding the film sheet in a mold cavity to obtain a pre-form;
    placing the pre-form in a mold cavity of an injection mold having a shape defining the desired plastic component; and
    injecting a thermoplastic elastomer into the mold cavity of the injection mold to generate a structural carrier for the pre-form, the generation of the structural carrier creating sufficient pressure and heat to bond the structural carrier to the bottom surface of the pre-form to form the molded laminate plastic badge.

2. The method of claim 1, wherein the thermoplastic elastomer is selected from the group consisting essentially of a thermoplastic polyolefin, thermoplastic urethane, polyester, polycarbonate, acrylonitrile/butadiene/styrene, polypropylene, a mixture of acrylonitrile/butadiene/styrene and polycarbonate, and mixtures thereof.

3. The method of claim 1, wherein the step of injecting a thermoplastic elastomer into the mold cavity occurs at a temperature of 420° F. and at a pressure of 50 psi to 15,000 psi.

4. The method of claim 1, further comprising the step of cutting the pre-form prior to the step of placing.

5. The method of claim 1, wherein the structural carrier has a flexural modulus in the range of 15,000 to 400,000 psi.

6. The method of claim 1, wherein the structural carrier has a durometer in the range of 15 Shore D to 100 Shore D.

7. The method of claim 1, wherein the film sheet has a total thickness of 0.2 mils.

8. The method of claim 1 wherein the polyvinylidine fluoride comprises more than 50% of the total thickness of the film sheet.

9. A method of manufacturing a molded laminate automotive component with integral badge portion, comprising:
    inserting a film sheet into a vacuum forming station to form the film sheet into a predetermined automotive component shape to create a formed film sheet having top and bottom surfaces, wherein the film sheet is coated with a layer of acrylic color and polyvinylidine fluoride and an acrylic clear coat, the film sheet being selected from the group consisting of polyester, polyurethane and polycarbonate;
    placing the formed film sheet in an injection mold cavity having a shape defining the automotive component with integral badge portion; and
    injecting a thermoplastic elastomer into the injection mold cavity, such that the thermoplastic elastomer is in mating contact with the bottom surface of the formed film sheet, to generate a structural carrier for the formed film sheet, the generation of the structural carrier creating sufficient pressure and heat to bond the structural carrier to the bottom surface of the formed film sheet to form the molded laminate automotive component with integral badge portion.

10. The method of claim 9 wherein the polyvinylidine fluoride comprises more than 50% of the total thickness of the film sheet.

11. A method of manufacturing a molded laminate automotive component and badge assembly, comprising:
    inserting a film sheet into a vacuum forming station to form the film sheet into a predetermined shape corresponding to the component and badge assembly to create a formed film sheet having top and bottom surfaces, the film sheet being selected from the group consisting of polyester, polyurethane and polycarbonate;
    placing the formed film sheet in a mold cavity of an injection mold having a shape defining the component and badge assembly;
    injecting a thermoplastic elastomer into the mold cavity of the injection mold, such that the thermoplastic elastomer is in mating contact with the bottom surface of the formed film sheet, to generate a structural carrier for the formed film sheet, the generation of the structural carrier creating sufficient pressure and heat to bond the structural carrier to the bottom surface of the formed film sheet to form the molded laminate component and badge assembly wherein the film sheet is coated with a layer of acrylic color and polyvinylidine fluoride and an acrylic clear coat layer.

12. The method of claim 11, wherein the polyvinylidine fluoride comprises more than 50% of the total thickness of the film sheet.

* * * * *